Dec. 9, 1947.  L. HEGY  2,432,418
ACTUATING MECHANISM FOR RADIO CONDENSERS
Filed Aug. 30, 1944

INVENTOR.
LOUIS HEGY
BY Ellwoodbury
ATTORNEY

Patented Dec. 9, 1947

2,432,418

UNITED STATES PATENT OFFICE 2,432,418

ACTUATING MECHANISM FOR RADIO CONDENSERS

Louis Hegy, Burbank, Calif., assignor to Bendix Aviation Corporation, South Bend, Ind., a corporation of Delaware Application August 30, 1944, Serial No. 551,882

7 Claims. (Cl. 74—10)

This invention relates to mechanisms for automatically controlling the rotation of a shaft exactly into predetermined angular positions and is particularly useful for remote control of variable condensers used to tune radio circuits and the like.

An object of the invention is to provide an actuating mechanism of the type referred to which converts rotation of an input or driving shaft into intermittent rotation of an output or driven shaft and holds the latter in exact predetermined angular positions while it is at rest, so that the driving shaft can be stopped at any point within a relatively large range of angular movement without impairing the accuracy of positioning of the driven shaft.

Another object is to provide an actuating mechanism for converting successive approximately equal angular movements of a driving shaft into intermittent accurately measured unequal angular movements of a driven shaft.

Still another object is to provide an actuating mechanism of the type described in the preceding paragraph in which the positions of rest of the driven shaft can be readily adjusted.

Other more specific objects and features of the invention will become apparent from the detailed description to follow of one embodiment of the invention.

In its simplest form, the invention comprises a crank pin on a driving shaft which is adapted in response to rotation of the driving shaft to intercept and rock an arm on a parallel driven shaft, in which the arm is curved with the same radius of curvature as the radius of revolution of the crank pin, so that after the crank pin has rocked the arm into a predetermined position it thereafter slides along the arm without moving it further. In addition, a spring mechanism holds the arm against the crank pin so that movement of the driven shaft out of the predetermined position by extraneous forces is prevented.

In a more practical form, the invention comprises a plurality of angularly and axially spaced crank pins on the driving shaft cooperating with a plurality of angularly and axially spaced arms on the driven shaft, so that approximate rotation of the driving shaft into predetermined angular positions rotates the driven shaft exactly into predetermined angular positions.

Figure 1:
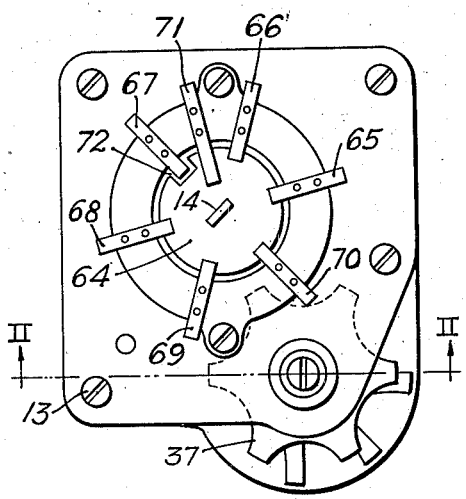
Fig. 1 is an end view of an actuating mechanism in accordance with the invention.
Figure 2:
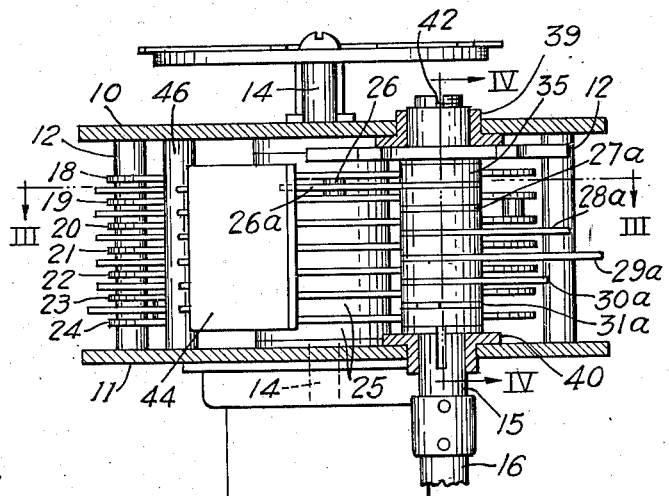
Fig. 2 is a view at right angles to Fig. 1 looking in the direction of the arrow II of Fig. 1.

Referring first to Fig. 2, there is disclosed a structure comprising a pair of parallel, spaced apart, frame plates 10 and 11, respectively, which are mutually supported from each other by a plurality of pillars 12, these pillars being secured to the frame plates by screws 13 (Fig. 1).

Figure 5:
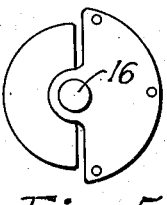
Fig. 5 is an end view of a variable condenser that may be actuated by the driven shaft of the mechanism shown in Figs. 1 to 4.

Journaled in the frame plates 10 and 11 are a driving shaft 14 and a driven shaft 15, the latter being shown coupled to a shaft 16, which may be the shaft of a variable condenser as shown in Fig. 5. The shaft 14 may be rotated in any desired manner, but as shown, it is connected at its lower end to the driving shaft of an electric motor 17. The motor is adapted to be energized and de-energized to move the shaft 14 approximately into anyone of a plurality of positions, by a control circuit to be described later.

Rigidly secured to the driving shaft 14 intermediate the frame plates 10 and 11 are a plurality of disks 18 to 24 inclusive which are spaced apart by a plurality of washers 25. The washers and disks may be pressed on to the shaft 14 or rigidly secured thereto in any desired manner. Supported by the successive pairs of adjacent disks are a plurality of crank pins 26, 27, 28, 29, 30, and 31 respectively. Successive pins being equally angularly spaced from each other at 60° intervals in the particular embodiment shown.

Figure 4:
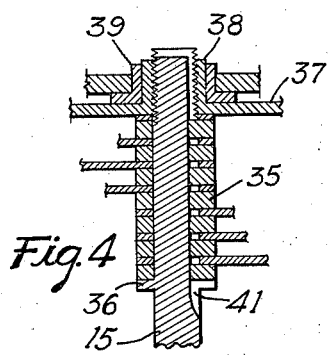
Fig. 4 is a detail section taken along the line IV—IV of Fig. 2.

The driven shaft 15 has mounted thereon, between the frame plates 10 and 11, a plurality of arms 26a, 27a, 28a, 29a, 30a, and 31a respectively, each being axially juxtaposed to the crank pin bearing the corresponding reference numerals. The arms 26a to 31a inclusive are spaced apart along the shaft 15 by spacing washers 35, the lowermost of which rests against a shoulder 36 (Fig. 4) on the shaft 15, and the uppermost of which bears against a starwheel 37 having a flange 38, which is threaded on to the upper end of shaft 15. The flange 38 is journaled in an upper bearing 39 mounted in an aperture provided therefor in the upper frame plate 10. The lower end of shaft 15 is directly journaled in a bearing 40 in the lower frame plate 11. The shaft 15 has a longitudinal keyway 41 and the spacer washers 35 have tongues fitting in the keyway so that they are non-rotatable with respect to the shaft 15. However, the arms 26a to 31a have circular apertures through which the shaft 15 extends, so that they are angularly adjustable on the shaft. Such adjustment can be readily effected by slightly loosening the starwheel 37, while the shaft 15 is restricted against rotation by a screw driver inserted in a slot 42 in the upper end thereof, and then moving one or more of the arms 26a to 31a inclusive into desired positions, after which the arms are locked securely in place by tightening the starwheel 37.

In operation, the driving shaft 14 is rotated by the motor into any one of six different positions spaced apart approximately 60°. In each one of the six positions, one of the crank pins 26 to 31 inclusive will lie against one of the arms 26a to 31a inclusive, and the edge of each arm that is contacted by its associated crank pin is arcuate and its center of curvature is coincident with the axis of the driving shaft 14, so that the arm remains in exactly the same angular position while its associated pin slides along its arcuate edge. Thus, in Fig. 3 the crank pin 26 is lying against the arcuate surface of the arm 26a, and the pin 26 can rock through a substantial angle in either direction without shifting the arm 26a. As a result, it is only necessary that the driving shaft 14 be stopped approximately at the desired position for the driven shaft 15 to be exactly located in a desired position.

It is desirable to hold each arm against its associated crank pin, and to this end I provide a holding mechanism that is actuated by that one of the crank pins next in advance of the crank pin that is engaging one of the arms on the driven shaft. This holding mechanism, as shown in the drawing, comprises a plate 44 having one edge juxtaposed to contact which ever one of the arms 26a to 31a inclusive happens to be engaged by one of the crank pins 26 to 31 inclusive. Adjacent its opposite edge, the plate 44 is welded or otherwise secured to the ends of a plurality of spring wire elements 45, which extend through a rock shaft 46, which is pivoted at opposite ends in the frame plates 10 and 11. The other ends of the wire elements 45 are aligned axially with different ones of the crank pins 26 to 31 inclusive, and the outer portions of the wires are preferably, although not necessarily, curved to have a radius of curvature equal to the radius of revolution of the crank pins.

Figure 3:
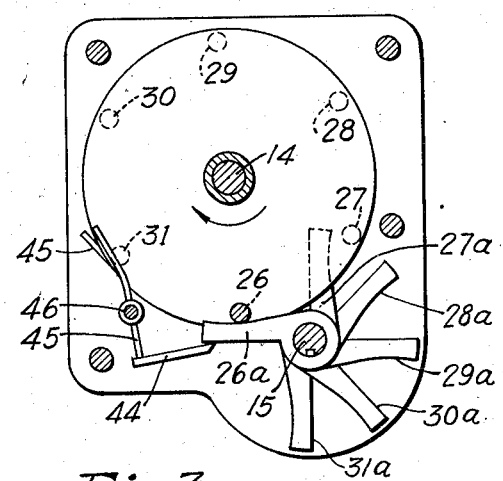
Fig. 3 is a section taken along the line III—III of Fig. 2.

It will be observed that in the position shown in Fig. 3 the outer end of one of the wires 45 is engaged by the crank pin 31, which is next in advance of the crank pin 26. As the pins moved into the position shown, pin 31 first rocked the plate 44 against the rear edge of the arm 26a and thereafter deflected the wire element 45 that it had contacted, to resiliently press the plate 44 against the arm 26a and hold it firmly against crank pin 26, so that there can be no tendency for the driven shaft 15 to rock in counterclockwise direction. If it is desired to move the driven shaft into a second position in which another of the arms 27a to 31a is moved into the angular position occupied by arm 26a in Fig. 3, the shaft 15 is rotated clockwise approximately into such position that the said other pin approximately occupies the position pin 26 occupies in Fig. 3. Initial movement of the shaft 14 out of the position shown will first carry pin 26 beyond the end of arm 26a and carry pin 31 beyond the wire element 45 that it was contacting; thereafter the next arm, 27a in this instance, will be engaged by the pin 27 and carried into the position previously occupied by arm 26a. At the same time crank pin 26 will engage one of the wire elements 45 and rock the plate 44, to hold the arm 27a against the pin 27. The driving shaft 14 can then be stopped or it can continue to rotate until some other desired one of the arms is engaged and moved into position of rest by its associated crank pin.

It will be observed that it is not essential that the different crank arms 26a to 31a inclusive be angularly spaced equal distances apart. However, there is a minimum angular spacing that must be maintained between successive arms; otherwise the holding plate 44 will strike against the end of the preceding arm.

It is also obvious that the angular spacing between the successive arms cannot be too great else the next arm to be engaged will lie outside the path of revolution of its associated crank pin.

However, there is a very substantial range of adjustment that is possible with the arrangement shown, and where the device is employed to actuate a radio tuning condenser, it is usually possible to so adjust the arms as to select six desired stations lying within the tuning band of the condenser.

Where two stations are located so close together that the angular distance through which the tuning condenser must be rotated is less than the minimum permissible angle between successive arms on the shaft 15, one of the stations can be tuned to by employing a condenser having semi-circular rotor plates 50 and semi-circular stator plates 51 as shown in Fig. 5. With such a condenser there are two positions for each capacity value, and one of the two positions is usually spaced far enough from the positions corresponding to other stations to avoid interference by the holding plate 44.

Figure 6:
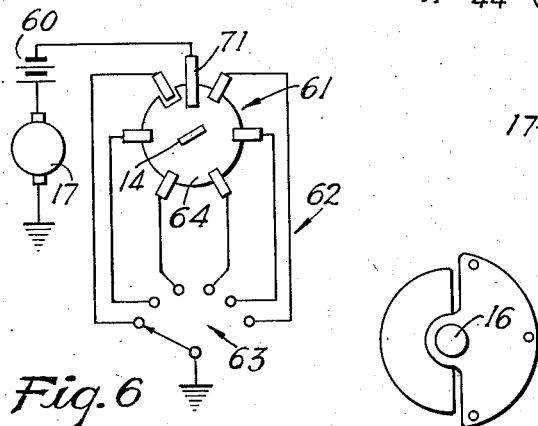
Fig. 6 is a schematic diagram showing a circuit that may be employed for remote control of the mechanism.

One remote control circuit that may be employed with the structure shown is illustrated in Fig. 6. It will be observed that the motor 17 is connected in series between ground and one terminal of a battery 60, and the other terminal of the battery is connected through an automatic switch mechanism 61, a plurality of leads 62 and a manual control switch 63 back to the ground. The switch 61 is built into the mechanism and as shown in Figs. 1 and 2, comprises a conductive disk 64 mounted on the shaft 14 for rotation therewith, and a plurality of equally spaced contacts 65, 66, 67, 68, 69, and 70. A master contact 71 is in contact with the disk 64 at all times. The disk 64 has a notch 72 therein which notch successively breaks contact between the disk 64 and the contacts 65 to 70 inclusive during rotation of the shaft 14.

It will be observed from Fig. 6 that if the switch 63 is moved to any new position, it will complete a circuit through one of the contacts 65 to 70, the disk 64, and the master contact 71, through the battery 60 and the motor 17, causing the latter to run and rotate the shaft 14. The motor will continue to run until the notch 72 reaches that one of the contacts 65 to 70 which is grounded by the switch 63, whereupon the motor will stop. The motor will not stop instantly, so the position of rest of the shaft 14 will not be accurately determined. The great advantage of the present system is that accurate stopping of the shaft 14 is not necessary. It may be desirable to employ some known expedient for decelerating the motor when the current is cut off, but in the great majority of cases, the most that is necessary is some form of dynamic braking of the motor such as may be achieved by using a motor having a permanent magnetic field and a relay connected in the energizing circuit of the motor for short circuiting the brushes when the current is cut off. Such expedients are well known.

Although for the purpose of explaining the invention one embodiment thereof has been disclosed and described in substantial detail, various departures from the exact structures shown can be made while still utilizing the advantages of the invention, and the invention is to be limited only to the extent set forth in the appended claims.

I claim:

1. A mechanism for exactly positioning a driven shaft in response to approximate positioning of a parallel driving shaft comprising: first crank means adapted to be revolved with said driving shaft; arm means connected to and projecting from said driven shaft into the path of revolution of said first crank means; said arm means having an arcuate surface intercepted by said first crank means, said arcuate surface being of the same radius as the radius of revolution of said first crank means, and the spacing between the axes of said driving and driven shafts being such that the center of curvature of said arcuate surface is coincident with the axis of said driving shaft in one angular position of said driven shaft.

2. A mechanism for exactly positioning a driven shaft in response to approximate positioning of a parallel driving shaft comprising: first crank means adapted to be revolved with said driving shaft; arm means connected to and projecting from said driven shaft into the path of revolution of said first crank means; said arm means having an arcuate surface intercepted by said first crank means, said arcuate surface being of the same radius as the radius of revolution of said first crank means, and the spacing between the axes of said driving and driven shafts being such that the center of curvature of said arcuate surface is coincident with the axis of said driving shaft in one angular position of said driven shaft; and means actuated from said driving shaft for urging said arm against said first crank means during at least a portion of the range of movement of said first crank means along the arcuate surface of said arm means.

3. A mechanism for exactly positioning a driven shaft in response to approximate positioning of a parallel driving shaft comprising: first crank means adapted to be revolved with said driving shaft; arm means connected to and projecting from said driven shaft into the path of revolution of said first crank means; said arm means having an arcuate surface intercepted by said first crank means, said arcuate surface being of the same radius as the radius of revolution of said first crank means, and the spacing between the axes of said driving and driven shafts being such that the center of curvature of said arcuate surface is coincident with the axis of said driving shaft in one angular position of said driven shaft; second crank means fixed relative to said first crank means for revolution therewith; and means actuated by said second crank means for urging said arm against said first crank means during at least a portion of the range of movement of said first crank means along the arcuate surface of said arm.

4. A mechanism for exactly positioning a driven shaft in response to approximate positioning of a parallel driving shaft comprising: crank means adapted to be revolved with said driving shaft; arm means connected to and projecting from said driven shaft into the path of revolution of said crank means; said arm means having an arcuate surface intercepted by said crank means, said arcuate surface being of the same radius as the radius of revolution of said crank means, and the spacing between the axes of said driving and driven shafts being such that the center of curvature of said arcuate surface is coincident with the axis of said driving shaft in one angular position of said driven shaft; second crank means revolved with said driving shaft; resilient lever means fulcrumed for oscillation and having one end oscillatable toward and away from the side of said arm means opposite the arcuate surface thereof and having its other end extending into the path of said second crank means when said first crank means is contacting said arcuate surface, whereby said second crank means engages said other end of said lever means and urges said one end against said arm means to hold the arm means against said first crank means.

5. A mechanism for positioning a driven shaft in a plurality of different angular positions in response to positioning of a parallel driving shaft in a plurality of corresponding positions, said mechanism comprising: a plurality of angularly spaced crank means adapted to be revolved by said driving shaft, said crank means being spaced axially from each other; and a plurality of axially spaced arm means connected to and projecting from said driven shaft into the paths of revolution of different ones of said crank means; in which said driven shaft is of circular cross section with a depressed axially extending keyway, said arm means having circular apertures through which said driven shaft extends, whereby said arm means are rotatable with respect to the shaft, separating washers on said shaft between which said arms are interleaved, said washers having keys extending into said keyway whereby they are non-rotatable with respect to said shaft, and means for longitudinally compressing said washers and arms together and frictionally locking said arms to said shaft for rotation therewith in desired positions of angular adjustment.

6. A mechanism for positioning a driven shaft in a plurality of different angular positions in response to positioning of a parallel driving shaft in a plurality of corresponding positions, said mechanism comprising: a plurality of angularly spaced crank means adapted to be revolved by said driving shaft, said crank means being spaced axially from each other; a plurality of axially spaced arm means connected to and projecting from said driven shaft into the paths of revolution of different ones of said crank means; each of said arm means having an arcuate surface of the same radius as the radius of revolution of its associated crank means and the spacing between the axes of said driving and driven shafts being such that the center of curvature of the arcuate surface of each arm means is coincident with the axis of said driving shaft in a different angular position of said driven shaft.

7. A mechanism as described in claim 6 including a plurality of parallel spaced disks on said driven shaft, each pair of adjacent disks supporting a pin extending therebetween, said pins constituting said crank means, and means for urging each arm against its associated crank means during at least a portion of the range of movement of said crank means along the arcuate surface of the arm, comprising lever means having a fulcrum axis parallel to said shafts, said lever means being axially continues at one end and being movable into the paths of all of said arms and being axially discontinuous at the other end to form separate fingers, each movable between a different pair of said disks into contact with the crank pin between that pair of disks.

LOUIS HEGY.

REFERENCES CITED

The following references are of record in the file of this patent:

UNITED STATES PATENTS

| Number | Name | Date |
|---|---|---|
| 2,307,673 | Fisher | Jan. 5, 1943 |
| 1,523,536 | Greene | Jan. 20, 1925 |

FOREIGN PATENTS

| Number | Country | Date |
|---|---|---|
| 24,534 | Great Britain | Dec. 20, 1893 |
| 853,360 | France | Nov. 28, 1939 |